Dec. 9, 1958　　　　W. E. GREEN　　　2,863,737
CHEMICAL REACTION APPARATUS
Filed Sept. 11, 1956　　　　　　　　3 Sheets-Sheet 1

United States Patent Office 2,863,737
Patented Dec. 9, 1958

2,863,737

CHEMICAL REACTION APPARATUS

Warren E. Green, Baton Rouge, La., assignor to Ethyl Corporation, New York, N. Y., a corporation of Delaware Application September 11, 1956, Serial No. 609,315

5 Claims. (Cl. 23—263)

This invention relates to apparatus for effecting chemical reactions. More particularly, the invention relates to new apparatus for effectively and substantially automatically carrying out a batch reaction between a liquid reagent and a highly communited solid reagent. Even more specifically, the apparatus is intended in preferred embodiments for performing batch reactions of the above character wherein the reaction products include a liquid product, gaseous by-products, and a comminuted residue of solid materials.

In a number of chemical processes, it is necessary to perform a reaction between liquids and finely divided solids under pressure. This is particularly true when the liquid reagent is a normally volatile substance, so that elevated pressure is necessary to provide contact between the liquid reactant and the solid reactant. In batch operations, particularly when either one or more of the initial reactants are toxic, or if the desired product is a toxic or hazardous material, particular precaution is required to maintain the reactants and reaction system in an isolated state at all times. Numerous examples of batch processes presenting these problems will be known to those skilled in the process industries. Among those which may be considered typical are the treatment of metallic salts with liquid acids to form a second desired salt and a volatile gaseous acid, the ethylation of a lead-sodium alloy with an ethyl halide or other liquid ethylating agent, and numerous other processes.

Generally in processes of this character, it is customary to initially charge the solid reagent and to feed the liquid reagent to the comminuted solids and conduct the reaction. During the initial introduction of the liquid, the reaction system is characterized by a very great excess of the solid reagent, and the finely divided solids present a very high surface area available for the reaction. The reaction will generally proceed quite rapidly during this portion of a cycle, but, because of the large physical and stoichiometric excess of solid reactant, efficient heat transmission is limited because of the paucity of a liquid phase. Upon continued introduction of a liquid reagent, the heat removal problem becomes simpler because of the presence of appreciable excess liquid which not only facilitates heat dissipation through the reaction mass, but, in addition serves as a vaporizable medium for removal of heat by vaporizing, condensing and refluxing. During the feed of the first part of the liquid, the temperature and pressure of the system will rise rather rapidly, and it is essential that the rate of feed be not in excess of the capacity of the reaction system and apparatus to safely distribute and dissipate the heat released. A further characteristic of many batch operations of the above character is the formation, during reaction, of small amounts of non-condensable by-product gases. These tend to build up in the reaction space and also to prevent efficient operation of the heat transfer equipment. Associated with this problem is the frequent use of an inert purge gas on the completion of a batch cycle. The residual inert gas remaining after a cycle affects the heat removal effectiveness of the system in the same way as non-condensables formed during reaction, and hence should be removed from the system.

Heretofore, it has been believed essential to provide manual control of reaction systems such as described above. This has been believed necessary particularly because of unbalance of the reaction system during the initial feed period. Hence, it has been customary to provide manual control of substantially the entire operation, including, especially, the feed of the liquid reagent. The necessity of such detailed manual control limits the effective utilization of personnel and in addition means that process efficiency hinges to a great extent on human judgment.

A need has therefore existed for apparatus for conducting reactions between solids and liquids which largely minimizes the amount of individual operational control manually exercised over the process, but which nevertheless avoids the difficulties associated with the tendency of the temperature and pressure to depart from a safe maximum rate of change, particularly during the initial feeding period of the process. Hence, an object of the present invention is to provide new and improved apparatus for conducting reactions. A more specific object is to provide a novel integrated reaction system wherein automatic control means are provided which exercise control over the most significant process variables in response to a plurality of indicia dependent upon the occurrence or sequence of such conditions. A more specific object is to provide apparatus which automatically achieves a more desirable reaction performance history, i. e., reaction performance curve expressed in a pressure-time fashion. A specific object of a preferred embodiment of the invention is to provide integrated apparatus suitable especially for effecting communited solids-liquid reactions characterized by the initial presence of a non-condensable purge gas and by the formation during reaction, of additional non-condensibles which similarly limit the heat dissipation capacity of the system. Other objects will be apparent hereinafter.

The invention comprises a process system of apparatus including certain controlling means, hereinafter enumerated in conjunction with primary apparatus. By primary apparatus is meant principally the apparatus units containing or directly processing the reagents. These include a reaction vessel or chamber, a reflux condenser, vapor and liquid lines to and from the condenser and reaction vessel. The reactor is desirably fitted with internal agitating means and usually with a jacket for flow of a heat transmission fluid for heating or cooling through the boundary of the reactor. Appropriate openings, with removable closures, are provided for feed of the comminuted solid reagents and for discharge of a reacted mixture. In many instances, the apparatus is provided with a vent line and a motored vent valve therein, for venting non-condensable gases or vapors from the system, the vent line usually connecting to the reflux condenser.

In addition to the primary apparatus the present invention includes control means associated with the primary apparatus, as follows:

(a) A primary controller for providing feed of liquid reagent to a reaction zone or vessel in such flow rate that non-uniform but pre-planned pressure time pattern is obtained, (b) A first limit controlling means for providing an elapsed time control overriding the controller (a), (c) A second limit controlling means for providing a total volume of liquid reagent control for a specific batch, overriding the controller (a), (d) A third limit controlling means for maintaining the process below a top or ceiling pressure, and for terminating or interrupting certain operations of the process apparatus and the several control devices.

It will be noted and understood more fully from the description hereafter that the foregoing overriding controllers ((b), (c), (d)) are concurrently operative, so that a multiple set of "ceilings" are imposed on the operation. In certain preferred and particular embodiments to be applied to plants for process having certain additional peculiarities, the foregoing means are supplemented with (e) Means for venting or bleeding minor amounts of noncondensable gases formed as by-products, in response to the pressure of reaction, but at such a rate that the pressure on the system is not materially affected by such venting, and (f) Lockout means couple with the controlled venting means (e) which provide an overriding venting during a portion of a reaction cycle by holding open the vent means regardless of the pressure in the system during this portion of the cycle, and (g) Means associated with apparatus for supplying liquid reagent at a pressure above the reactor operating pressure, these associated means serving to interrupt the time measurement and control of (b) and for interrupting, by discontinuance of flow, the feed of liquid reagent as in (a) if the pressure falls.

A full understanding of the invention will be readily obtained from the following description and figures. For clarity of presentation, a typical process cycle, as controlled by a preferred embodiment of the invention is illustrated firstly, followed by a more detailed discussion of the several mechanisms forming the present invention. The descriptions will be clear in conjunction with the figures wherein Fig. 1 is a general schematic process apparatus layout showing the reactor, condenser and several lines or conduits, plus the several mechanisms of a typical embodiment of the present invention.

Figure 1:
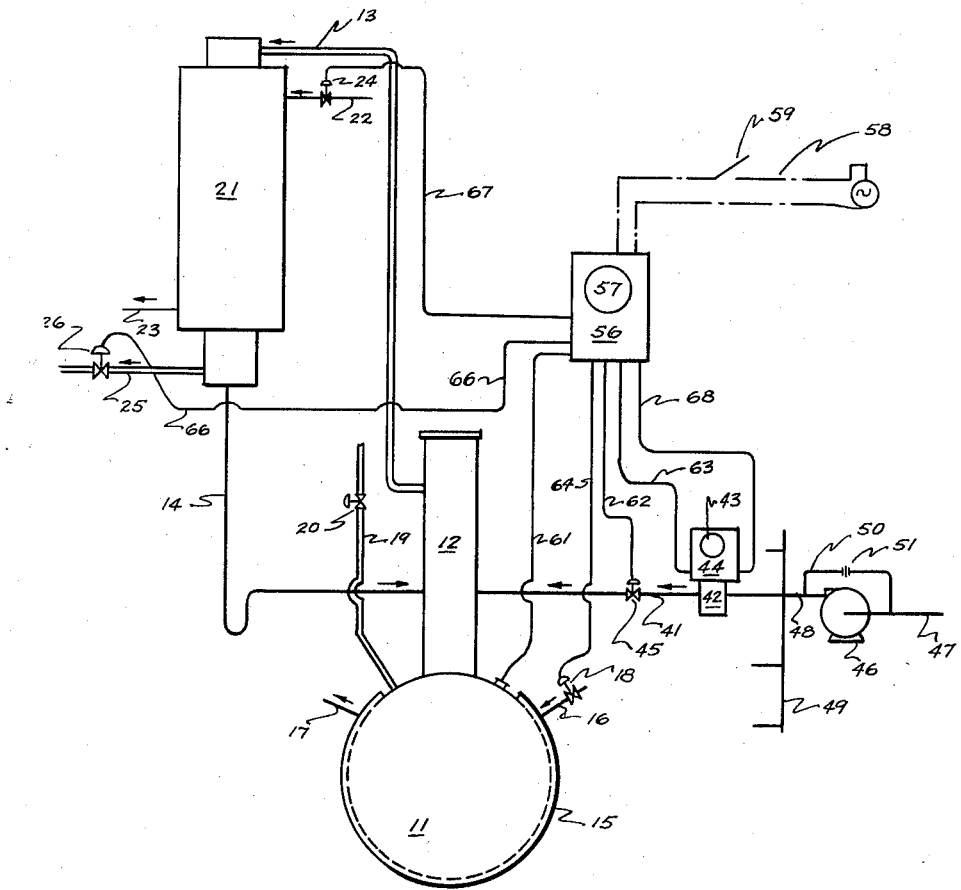

Turning to Fig. 1, the main elements of apparatus include a reaction vessel or autoclave 11, and a reflux condenser 21. A charge pipe or standpipe 12 surmounting the autoclave 11 body provides a vapor space and a zone for convenient tie in of several lines hereafter cited. (Hereinafter, the space of the standpipe 12 is considered to be identical with a part of the autoclave 11 space.) A liquid reagent feed line 41 provides for introducing the liquid reactant to the autoclave 11. A vapor line 13 provides for transmittal of vapors from the autoclave 11 to the reflux condenser 21. A liquid reflux line 14 is provided connecting the reflux condenser 21 and the autoclave 11, for return of condensed liquid. The autoclave body is desirably provided with a heat transmission fluid jacket 15, lines 16, 17 being provided for introduction and discharge of the coolant or heating liquid. A motored valve 18 in the inlet line 16 provides for control of flow of the heat transmission liquid. An emergency relief line 19 fitted with a relief valve 20 is provided for direct venting of excess pressure from the autoclave when necessary.

The reflux condenser 21 can be any of several different types, refrigerant flow being provided by an inlet line 22 and an outlet line 23. The flow of coolant is controlled by a motored valve 24 in the inlet line 22. A partial vent line 25 is provided for release of vapors from the condenser, a motored valve 26 in the vapor line 25 controlling the release of such vapor.

In the typical embodiment illustrated by this figure the flow of the liquid reagent is provided by a centrifugal pump 46, which receives liquid reagent through a main supply line 47. A discharge line 48 feeds a manifold 49, the supply line 41 of the present embodiment being one of several branches from this manifold supplying a series of parallel units. A return by-pass line 50 having an orifice 51 therein is provided around the pump 46 for reasons hereafter described.

A fluid volume meter 42 is positioned in the supply line 41 for measuring the quantity of liquid. An indicating dial 43 provides a record of the integrated quantity of liquid reagent. A case 44 houses the volume integrating mechanism and other means hereafter described which are operatively connected with the meter 42.

A motored valve 45 is positioned in the liquid reagent line 41, for controlling the flow of the liquid reagent.

A case or "station" 56 contains several means including the vital control mechanisms of the invention, described in more detail hereafter. Included among the means in this "station" are a pressure responsive element and indicating and recording mechanism associated therewith, a time-pressure record being usually provided on a chart 57. Certain of the elements in this station may include electrically driven motors and other elements; the current for their operation being provided through electrical leads 58. A master switch 59 is provided for initiating action.

Various sensing and actuating "conduits" are provided joining the elements within the station 56 and the several devices for controlling the process. The term "conduits" refers to both electrical lines and pneumatic pressure conduits, both electrical potential and air pressure being utilized, and, in some instances, both being equally suitable for a specific function. These conduits include a line 61, for transmitting autoclave pressure to a pressure responsive element. A compressed air line 62 leads to the motored valve 45 from the station 56, for actuating and positioning the valve 45 to achieve a pre-scheduled time-pressure history within the autoclave 11. An electrical line 63, from mechanism associated with volume integrating mechanism in the volume meter case 44, passes to the station 56 to interrupt actuating pressure therein and thus cause closure of the motored valve 45. Generally, the motored valve 45 for control of liquid reagent feed is of the air-to-open type.

Another air impulse line 64 leads from means in the control station 56 to a motored valve 18 in the inlet line 16 to the autoclave coolant, for initiating coolant flow upon attainment of a desired pressure in the autoclave 11. Still another air transmission line 66 leads from means in the control station 56 to the motored valve 26 in the vent line 25 from the reflux condenser 21. Yet another air line 67 is provided leading from means in the control station 56, to the motored valve 24 in coolant fluid line 22 to the reflux condenser 21.

An electrical lead line 68 connects counting or integrating means in case 44, associated with the volume meter 42, for zeroing the mechanism of the volume counter.

It will be obvious that the elements described above, for full effectiveness, require intimate correlation of operation. These correlations are attainable by a variety of means as described in more detail hereafter. Prior to describing these more fully, it will be helpful to describe a graphic representation of a typical batch operating cycle. For purposes of illustration, the cycle is described with reference to the ethylation of the lead of a comminuted sodium-lead alloy to form tetraethyllead. Similar pressure time patterns, differing quantitatively, would be presented for other reacting systems.

Figure 2:
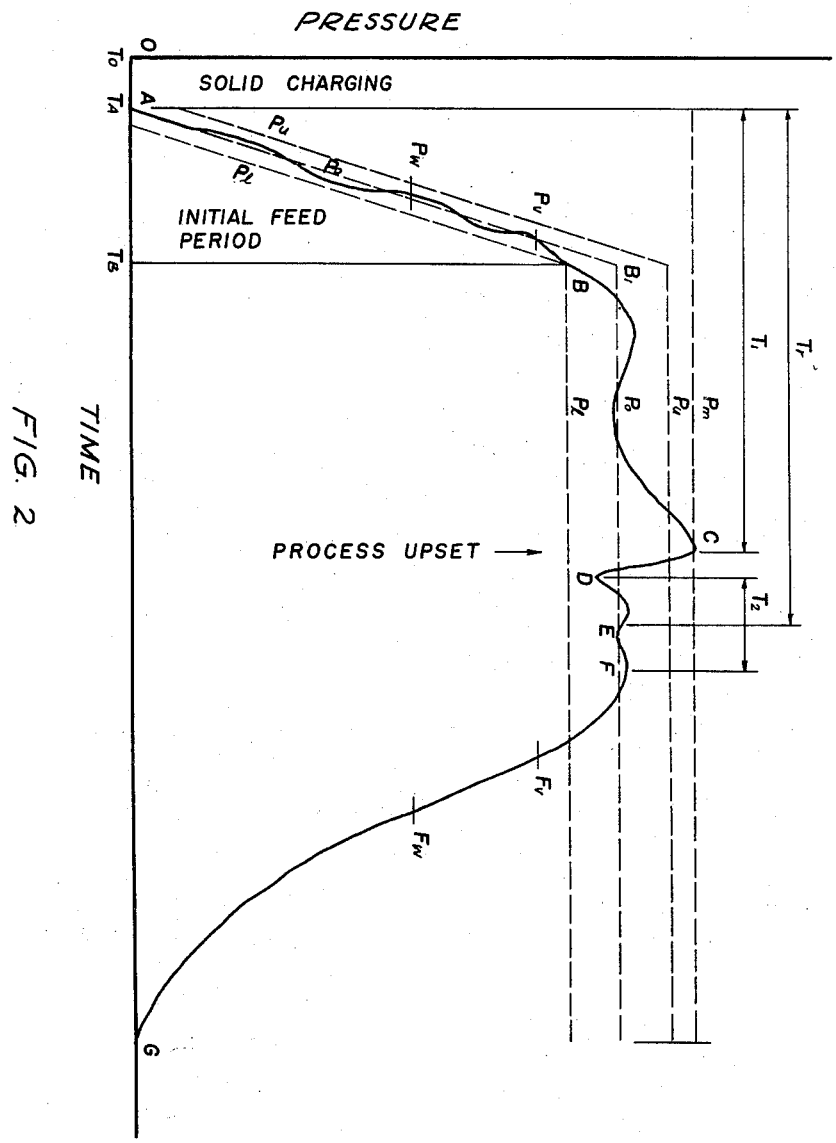
Fig. 2 is a graphical presentation of a typical operational sequence, i. e. a pressure-time plot with notations defining the operative effect of the several elements of the present invention.

Turning to Fig. 2, a typical plot of autoclave operating pressure against time is shown. The initial step of a cycle is a brief period OA for charging solids to the autoclave. Most of the remaining portion of the time cycle is taken up with the reaction, represented by the curve ABCDEFG.

The initial portion of this reaction curve is a rapidly rising pressure period AB. During this portion, a time mechanism moves an indicating set point element to provide a rising pressure schedule path $AB_1$. Dependent upon the particular means utilized, this path may be a straight line or a series of small steps approximating a straight line. The differential pressure between this schedule path $AB_1$ and the actual autoclave pressure, represented by the curve segment AB, provides a motivating force or increment which is employed to initiate controlling impulses which govern the flow of liquid reagent feed. It has been found that a controlling device of the proportional band type is quite satisfactory in this service, although a proportional band with automatic reset can be desirably used in some instances. Thus, designating the desired operating pressure path as $P_o$, parallel pressure paths represent an upper limit $P_u$ and a lower limit $P_1$ of the proportional band.

When the rising pressure control or set point reaches a predetermined pressure level $P_w$ means are activated which initiate a flow of cooling medium through the autoclave jacket. As the pressure set point rises further to a point $P_v$ means are provided to actuate a normal partial venting operation. However, since in this particular system the reaction space is initially filled with inert non-condensable gas, provision is made to release the inert gas during the initial portion of the rising pressure period. In other words, the partial venting control mechanism is locked out during this segment of operation.

When the rising pressure schedule reaches a point $B_1$ the operation of the rise timer, moving the set point element mentioned above, is discontinued, and normal automatic control is initiated to maintain the autoclave pressure in the constant pressure band represented by an upper pressure limit $P_u$ and the lower pressure level $P_1$, starting at time $T_B$. This control is effected primarily by the rate of feed of the liquid reagent.

We now return to the process variables to which the controlling means are responsive and initiate or terminate operations for the control of the process. In addition to the operating pressure level $P_o$ (and the proportional band $P_u$ to $P_1$), a maximum pressure limit $P_m$ is applied in most embodiments of the apparatus of the invention. Whereas any actual pressure variation within the pressure band merely results in operation of the control means actuating the feed of liquid reagent, if the actual pressure rises to the overriding maximum pressure (as at point C) the control operations are interrupted. In other words the control means are disconnected. This results in a stopping of the timing element and a shut off of all flow of liquid reagent. The timing element provides, generally, a limit of the total time period during which liquid reagent can be fed. In normal operations, this time lapse is an uninterrupted period. In the present instance, selected as an unusual cycle, the running of this timed interval is interrupted by the occurrence of the maximum pressure $P_m$ at point C. When the pressure has been reduced to a point D below the desired operating range, the control means are restarted manually. In this cycle, then, the timed portion includes two segments, one segment $T_1$ being from the start of liquid reagent flow to the occurrence of the shut down pressure C. The second segment $T_2$ runs from the time of restarting of the apparatus. When the timed interval has run (whether it is a continuous period or includes several segments, as above described) means are provided for terminating the air output to the motored valve admitting liquid reagent. In other words, the controlled system is deactivated from this point so that flow of liquid reagent is stopped.

An overriding control step is, however, provided independently of the above described time lapse, this control step operating to terminate the flow of liquid reagents when a pre-selected total quantity has been provided. The time for this integrated quantity of feed is, of course, variable, and is indicated graphically as $T_r$.

It is thus apparent that the feed of liquid reagent is terminated, in the cycle illustrated by Fig. 2, at point E before the lapse of the full time allotted by the timing means, which discontinues the air to the motored valve at point F.

At point E, then the total quantity of liquid reagent has been introduced and the reaction is near completion. At point F the time allotted for the control mechanism has elapsed. At this point, then, means are provided which isolate the controller from the motored valve which controls the feed of liquid reagent. However, in the present cycle the flow of liquid reagent has already been terminated by the feed of the preselected quantity of liquid reagent as described above. The pressure in the reaction system begins decreasing after discontinuing the ethyl chloride feed, or shortly thereafter. When a predetermined pressure $F_v$ is reached, partial venting after condensing, to release only non-condensable gases, is stopped. At a pressure $F_w$, which can be the same or slightly below the pressure $F_v$ at which the non-condensable venting is ended, the flow of cooling medium to the reactor jacket is terminated. At this pressure range full venting is started, that is, the compressed vapors are released to a recovery system without refluxing. The pressure is thus lowered to atmospheric pressure, and the reactor can then be discharged. Full venting, in contrast to the controlled partial venting operation already mentioned is at a potentially much higher rate. Whereas the controlled venting, when at a maximum rate, does not materially effect the reaction pressure, the full venting can release sufficient vapors to reduce the pressure relatively quickly.

To fully understand the interrelationship and mode of operation of the several elements forming the apparatus of the invention, the following gives a more detailed description of typical units arranged generally as shown in Fig. 1. As noted more specifically hereafter, various alternatives for the several units are possible without departing from the spirit of the invention.

The control station 56 includes a pressure indicating means and, usually, a pressure recording device. The pressure indicator may be of the conventional Bourdon tube type with linkage to an indicating pointer and pen. A timer driven chart is provided so that a continuous record of actual pressure can be made. The operation of this timer is desirably always continuous and independent of the control apparatus, so that a pressure record is provided without regard to the controlling operations. Associated with the pressure sensing and recording means are primary controlling means for controlling the flow of liquid reagent. These means include a rate of rise timer. The rate of rise timer, can be a constant speed electric motor with appropriate mechanism operatively connected to any driven element. This timer changes the position of a movable pressure proportional element or set point, which may include a scale pointer and pen, in accordance with a predetermined rise with time schedule, until a desired pressure is reached. The set point rise time pattern is usually a step pattern, but means can be provided to give a linear pressure rise pattern. When the set point attains a position corresponding to a desired operating pressure, the operation of the rate of rise timer is terminated and operation of a hold timer is initiated. A primary controlling mechanism is operatively connected to the pressure indicating element. This mechanism is suitably of the conventional pneumatic type, wherein a movable flapper is used to partly or completely throttle a stream of instrument air emitted from a nozzle. Variation in pressure of air in the line feeding the nozzle is transmitted either directly or indirectly, to an operated element, in this instance, an air motored valve 45 for control of the flow of liquid reagent. Generally, the motored valve should be of the air-to-open type.

In addition to the above described control means associated with the pressure gauge and rise timer, further control means are desirably provided to initiate flow of the cooling fluid for the reflux condenser 21, for flow of cooling water through the autoclave jacket 15, and for venting of non-condensable by-product gases through the vent line 25. These control means may be of the air type. Thus an air impulse can be transmitted through line 64 to allow flow of cooling water by the valve 18, through line 16. Similarly, refrigerant or water flow to the reflux condenser 21 can be initiated by air pressure transmitted by line 67 to the motored valve 24, admitting refrigerants through line 22. In the case of the control mechanism for the controlled venting operation, similar mechanism is employed to activate motored valve 26 by pressure transmitted through line 66. In the present embodiment, as described hereinafter, coupled with this control element is a lockout mechanism which provides an opening impulse through line 66 during a portion of the rising pressure portion of a cycle. An embodiment of this mechanism is described hereafter.

In addition to the rise timer mentioned above, also a part of the pressure recorder-primary controller apparatus is a hold-timer which provides an overriding total time control. This timer is suitably a constant speed electric motor and appropriate gearing or other linkage. Its operation is initiated at the end of the operation of the rate of rise timer, or if desired at the same time. When a finate elapsed time has expired and has been measured, switch means associated with the hold timer terminates the output of air pressure through line 62 to the motored ethyl chloride valve 45, thus resulting in its closure. This operation does not occur, of course, if the feed of liquid reagent has already provided the desired total quantity (as in Fig. 2).

A particular feature of the apparatus are means for discharging inert purge gas in the autoclave space, this being a residuum from a preceding cycle. Thus, apparatus, as shown in Fig. 3 is provided for two types of venting, i. e., release of inert residual gases and venting of newly formed non-condensable gases.

Figure 3:
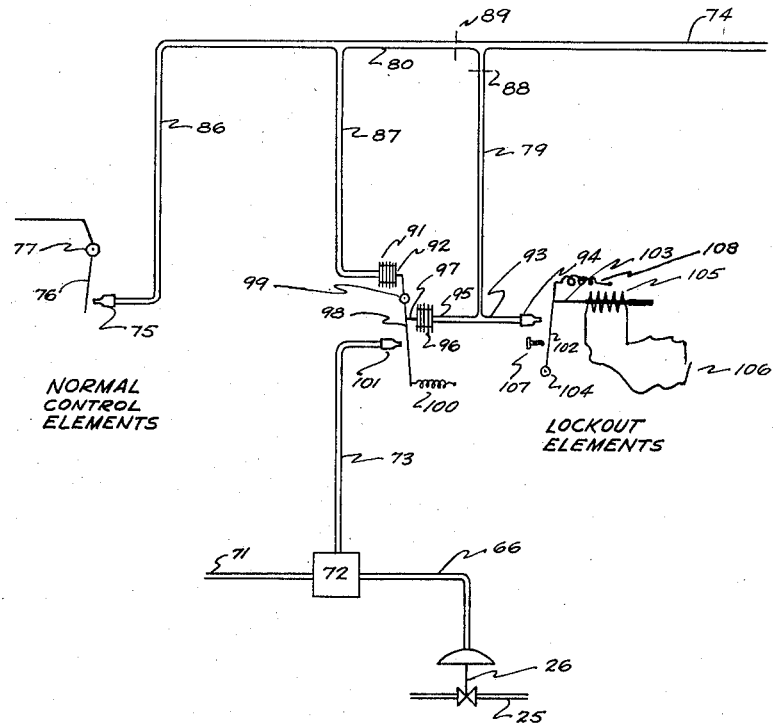
Fig. 3 shows a detailed arrangement of a lockout means forming a portion of preferred embodiments of the present invention.

Referring to Fig. 3 a schematic diagram is given showing the lockout system as applied to the air actuated motored valve 26. The following description refers to the embodiment wherein the motored valve 26 is of the air-to-open type, although the reverse type (air-to-close) valve is equally applicable to the system with certain revisions.

The principal portions of the apparatus include a normal control section and a lockout control section. The normal control section provides actuating impulses of air to the motored valve 26 in response to autoclave pressure variations, but the lockout control section prevents such functioning, and, in effect, provides air impulse to the motored valve, to open during the rising pressure period of a cycle.

The lockout system desirably also includes a relay station 72, which transmits actuating air through a line 66 to the motored valve 26. A general air supply line 71 supplies constant pressure air, at a controlled pressure of about 17 p. s. i. g. to the relay station 72. A lead line 73 contains air whose pressure is varied as described hereinafter, and such pressure determines the quantity of actuating air delivery through the line 66.

Turning to the major subassembly of the lockout mechanism proper, these include a normal control section and a lockout control section. Instrument air, again at a controlled pressure of about 17 p. s. i. g. is provided to both sections through a header or manifold line 74. This manifold line divides into two branches, one branch 79 leading to the lockout control section, the other branch 80 having a first sub-branch 86 leading to the normal control section and a second sub-branch 87 leading to the lockout control section. Both of the major branches 79, 80 are separated from the manifold or supply line 74 by limiting orifices 88, 89. These orifices have much lower flow capacity than the nozzles hereafter mentioned. This means that the branches, downstream from these limiting orifices, are in effect systems isolated from the header or manifold 74.

Turning to the operative elements of the normal control section, these include a nozzle 75 at the terminus of sub-branch 86, and a flapper 76 pivoted on a fulcrum 77. This flapper is linked by appropriate means to elements not shown which are directly responsive to the actual pressure in the reaction vessel or autoclave. The linkage is such that on increase of pressure in the autoclave, with the corresponding movement of the pressure indicating element, the flapper 76 moves toward the nozzle 75, thus tending to prevent escape of air, and building up the pressure back of the nozzle 75. The sub-branch 87 terminates in a closed bellows-pin unit 91. It will be apparent that an increase in pressure in branch 80 occasioned by closing of the nozzle 75 will result in expansion of the bellows 91 and outward movement of the pin 92 associated therewith.

The branch 79 to the lockout control section is further divided into two sub-branches, one sub-branch 93 terminating in a nozzle 94 and the second sub-branch 95 being terminated by a bellows unit 96 having a pin-extension 97. Associated with the lockout control section is a main flapper 98. The main flapper 98 is pivoted at a fulcrum 99 intermediate the two bellows units 91, 96. A light spring 100 maintains the flapper 98 engaging either or both of the pins 92, 97 dependent on their extension by the bellows 91, 96. The main flapper 98 has positioned adjacent to it a main nozzle 101 at the terminus of the air-signal line 73 to the relay station 72. Adjacent the nozzle 94 is an overriding flapper 102, pivoted on a fulcrum 104. The flapper 102 is engaged, by the action of a light spring 108, against the end of a rod 103 actuated by a solenoid 105 which can be energized by a switch 106. A set screw 107 provides for limiting the movement of the flapper 102 toward the nozzle 94, when desired.

Considering the operation of the entire unit as a whole, closing switch 106 energizes the solenoid and pushes the overriding flapper 102 against the nozzle 94. The switch 106 is customarily operated manually by appropriate connection with a start button circuit as described later herein. This results in a build up of pressure in the branch 79 which in turn causes expansion of the bellows 96 and extension of the pin 97, pushing the control flapper 98 to close off the main nozzle 101, thereby building up pressure in the line 73. This pressure increase, by activating the relay mechanism 72 results in a flow of air in the valve actuating line 66 causing the valve 26 to open. When the pressure of the autoclave system rises to an appropriate predetermined level the linkage heretofore mentioned results in closure of the nozzle 75 by the flapper 76, a build up in pressure in branch 80 and sub-branch 87, causing expansion of the nozzle-pin assembly which in turn pivots control flapper 98 to close the nozzle 101 (or if flapper 98 is in the closed position, the above described action maintains that position). Thus it is clear that after the normal control section is actuated by attainment of pressure in the autoclave system of a predetermined set point, that air flow to the motored valve 26 is achieved in normal manner. The reason that, at this point, the absence of closure of the nozzle 94 on sub-branch 93 is immaterial is because of the isolation achieved by the restricting orifices 88, 89.

The functioning of the lockout mechanism is, as explained above, contingent on energizing the solenoid 105 by closure of the switch 106. The switch means 106 are suitably associated with the rise timer heretofore discussed so that the switch 106 is closed as soon as the rise timer is started, but is opened when the set point obtains the pressure at which the normal controller is set to operate. The switch is not again closed until a new cycle is started.

A further refinement of the lockout mechanism is provided by the set screw 107, acting as a limiting stop to the overriding flapper 102. This permits a variation in the amount of throttling applied to the air stream from the nozzle 94 when the solenoid 105 is energized, and this, in turn, limits the amount of closure applied to the main nozzle 101. This in turn determines the amount of opening pressure applied to the vent valve 26. The significance of this provision is that, if desired or necessary, a different rate of venting of original inert gases can be provided, by the lockout mechanism, than is subsequently provided by the normal venting of the non-condensable gases, thus providing a greater degree of flexibility.

A significant feature of the present invention is the overriding control or limit mechanism based on the quantity of liquid reagent fed. Generally, this portion of the apparatus includes a volume meter and appropriate means to terminate the flow of liquid reagent when the total volume is attained. Such means can suitably be an electrical circuit initially closed or made by a start circuit which initiates action of the volume meter (as well as the timing means already discussed). The closure of this circuit can activate or energize a solenoid, positioning a solenoid plunger which is linked to a flapper. When so positioned, this flapper closes a nozzle which terminates a branch instrument air line. The discharge capacity of this nozzle is relatively high. Thus, when it is opened, there will be no build up of air pressure by the normal flapper action and hence no operation of the motored valve. Conversely, when the first mentioned nozzle is closed build up of air pressure occurs in the normal fashion, for control of operations of the motored valve. The overriding action of the volume limit control is accomplished by a switch associated therewith which opens the electrical circuit, de-energizing the solenoid, and removing the flapper from the nozzle. This permits the controlled air to be vented, thus, in effect, preventing output air to the motored valve.

The maximum pressure limit controller may take several different forms. A suitable mechanism for this function includes a switch in the same electrical circuit referred to with reference to the volume controller. This switch is operatively connected to the actual pressure sensing device and is opened if a pre-selected maximum pressure is reached. This de-energizes the solenoid, in the same manner as mentioned above, and discontinues the air output to the motored valve. In addition to this function, the maximum pressure controller interrupts the operations of the timers already described. This is done, for example, by causing switches, in the power supply circuits to the timers, to open. Means are provided, however, which prevent the zeroing of these timers. Then, as described with reference to Fig. 2, despite the interruption of measured time, reinitiation of operation of the timing mechanisms continues the cumulative measurement.

As already mentioned, a necessary mechanism for the apparatus are means to provide a constant supply pressure of the liquid ethyl chloride reagent, and control means associated therewith for safeguarding the process. A typical mechanism as above is illustrated in part in Fig. 2 to which reference is made. The centrifugal pump 46 delivers such liquid reagent for the multiple units supplied at a delivery pressure appreciably above the maximum operating pressure of the autoclave 11. Because of the intermittent operation of these reaction vessels and cyclic character of the process, the actual delivery flow from the pump 46 is, of course, variable. The by-pass line 50 provides for this situation, by allowing return of non-delivered ethyl chloride to the low pressure supply line 47. A small orifice in the return line or by-pass line 50 permits continuous flow, the orifice being sized so that if no reagent whatsoever is being delivered to the reaction vessels, the pressure drop and energy consumption not passing through the orifice 51 is such that the work input to the liquid reagent is appropriately dissipated.

A check valve not shown in each unit supply line 41 provides that there will be no back-up of liquid reagent in the event that the pump 46 fails to operate, or ceases operation, when the autoclave is under reaction pressure. If for some reason the pump fails to deliver sufficient pressure, means are associated therewith, responsive to the pressures in the individual feed lines (e. g., 41) which terminate or interrupt the controlling function. More specifically, this interruption includes a discontinuation of the hold timer operation, and also an interruption of air output to the motored valve 45 in the ethyl chloride feed line 41. The means for accomplishing the latter is desirably the same as already described with reference to the maximum pressure control element, viz., by de-energizing a solenoid, a flapper is removed from a nozzle which bleeds air from the control system which actuates the ethyl chloride feed valve 45, causing it to return to a normal closed position.

It will be apparent from the preceding description, particularly of the several discrete mechanisms associated with this apparatus, that their individual operations are necessarily coordinated together or made contingent upon certain sequential events or process variable conditions. The means for such coordinated and interrelated operation will suitably and preferably be by electrical circuits, although such means are not limited to electrical devices.

In order to describe a typical electrical interrelating circuit arrangement the following describes the functions of the several mechanisms in the course of a batch operation such as was described with reference to Fig. 2.

Upon completion of the charge of solid reagent, and closure of the autoclave, the operator depresses a start button switch. By appropriate electrical circuits, this press operation energizes a circuit for resetting the hold timer or rezeroing. In addition it resets the set point of the pressure controller mechanism to zero, and also resets the volume meter or counter 42 to zero.

Release of the start button also performs a plurality of functions. It energizes the air output overriding solenoid heretofore described. In other words, it energizes the solenoid which closes the nozzle which permits build up of instrument air pressure under the influence of the control mechanism and nozzles. Secondly, the start button release energizes an additional solenoid (see Fig. 3, solenoid 105) which actuates the lockup unit heretofore described in detail. This actuation results in opening of the motored vent valve 26. Thirdly, the start button release initiates operation of the rate of rise timer mechanism. This mechanism suitably includes a constant speed motor driving adjustable cam type switches. These provide for intermittent operation of a constant speed motor driving the set point element. This provides the step wise increase of the pressure set point on a time cycle. Lastly, the start button release energizes the volume counter 42, which is provided with lock in mechanism so that it can be rezeroed only by the pressing of a normal starter button as mentioned above and only after having once reached its set count.

As the set point of the control mechanism reaches a desired operating pressure $P_o$ (see Fig. 2) a switch is closed which by appropriate relay means disconnects or de-energizes the rise timer and rate motor and energizes or initiates operation of the hold timer.

When the actual pressure record pen reaches the desired operating pressure, an additional switch is closed which by relay means operates an additional switch de-energizing the solenoid which causes the lockout mechanism to function (Fig. 3, solenoid 105). It will be noted that the above described energizing and de-energizing circuits result in the lockout mechanism functioning through and beyond the pressure set point at which normal functioning of the motored vent valve 26 would occur. The significance of this is that by this overlapping control and opening of the vent valve, there is no opportunity for "chattering." When the lockout mechanism is de-energized, the pressure of the system will invariably be above the pressure at which normal functioning will open the vent valve 26.

As already described, a variety of "upset" factors may occur which would cause a process interruption. These are the attainment of a maximum pressure $P_m$ (see Fig. 2), or if the pressure in the feed line 41 drops below the necessary level. These events provide operations as described below, and in addition if the predetermined volume of liquid is measured by the volume control 42, a comparable function occurs. This function is the closure of switches which energize a relay which in turn de-energizes the overriding air output solenoid and also the power input to the hold timer. Thus, the occurrences of any of the above three events results in immediate termination of flow of the liquid ethyl chloride reagent.

Upon correction of the upset condition or conditions mentioned above (viz. the attainment of an autoclave pressure within the control band (a pressure between $P_u$ or $P_1$), or the attainment of sufficient ethyl chloride feed line pressure) then an emergency start button can be depressed. Pressing the emergency start button de-energizes the relay mentioned above, thereby allowing resumption of operation of the hold timer and again energizing the overriding air output solenoid.

It will be apparent to those skilled in the art that appreciable variation is permissible in the several control means, without departure from the scope of the invention. Some of these variables are mentioned below.

As already discussed, the motored valves of the apparatus are usually of the normally closed type, requiring motor operation to open. Valves of the air-to-close type can also be used, and in this case, appropriate reversal of the several control means will be provided.

Generally, it is preferred that the actuating medium or power source for the several mechanisms be electrical power and compressed air, as specifically described above. However, in many instances alternative power sources can be utilized. For example, instead of utilizing air energized motors for the partial vent valve 26 or the liquid reagent feed valve 45, electrically energized motors can be employed. Similarly, instead of constant speed electrical motors for driving the timed elements, spring driven clock work mechanisms can be provided.

Another alternative mechanism is a mechanical device for positioning the set point element. Such a device can be a cam which mechanically moves a set point element. The cam can be driven by a constant speed mechanism, thus providing a predetermined time pressure position schedule for the set point element, this schedule including the rising pressure period and the constant pressure period discussed above.

Having fully described the apparatus of the invention, what is claimed is:

I claim:

1. An apparatus for the controlled reaction of comminuted solids and a volatile liquid reagent, comprising a reaction chamber, a reflux condenser, a vapor line and a liquid reflux line both connecting the said reaction chamber and reflux condenser, a vent line communicating with the reaction chamber for venting gases therefrom, a motored vent valve therein for control of venting, a liquid reagent feed line communicating with the reaction chamber for feed of reagent thereto and a motored valve therein for control of liquid reagent feed, a pressure gauge connected to the reaction space for measuring the pressure therein and a primary control means operatively connected to the pressure gauge, said control means including a pressure set point mechanism and a pressure rise timer engageable therewith and adapted to raise the pressure set point through a rising pressure path to a preselected pressure during an initial time period, and a hold timer adapted to maintain the pressure set point mechanism at said preselected pressure following the said initial time period, and a controller responsive to any difference between the set point pressure and the actual pressure measured by the pressure gauge and operatively connected to the motored valve in the liquid reagent feed line for opening said valve when the set point pressure exceeds the actual pressure and closing the valve when the actual pressure exceeds the set point pressure.

2. An apparatus for the controlled reaction of comminuted solids and a volatile liquid reagent, comprising a reaction chamber, a reflux condenser, a vapor line and a liquid reflux line both connecting the said reaction chamber and reflux condenser, a vent line communicating with the reaction chamber for venting gases therefrom, a motored vent valve therein for control of venting, a liquid reagent feed line communicating with the reaction chamber for feed of reagent thereto and a motored valve therein for control of liquid reagent feed, a pressure gauge connected to the reaction space for measuring the pressure therein and a primary control means operatively connected to the pressure gauge, a liquid volume meter in the liquid reagent feed line for measuring the volume of liquid reagent and a limit control means operatively connected to the volume meter; the primary control means including a pressure set point mechanism and a pressure rise timer engageable therewith and adapted to raise the pressure set point through a rising pressure path to a preselected pressure during an initial time period, and a hold timer adapted to maintain the pressure set point mechanism at said preselected pressure following the said initial time period, and a controller responsive to any difference between the set point pressure and the actual pressure measured by the pressure gauge and operatively connected to the motored valve in the liquid reagent feed line for opening said valve when the set point pressure exceeds the actual pressure and closing the valve when the actual pressure exceeds the set point pressure; the limit control means being operatively connected to the motored valve in the liquid reagent line and adapted to initiate closure thereof when a predetermined quantity of liquid has passed through the volume meter.

3. An apparatus for the controlled reaction of comminuted solids and a volatile liquid reagent, said reaction being characterized by the formation of minor amounts of non-condensable by-product gases, comprising a reaction chamber, a reflux condenser, a vapor line and a liquid reflux line both connecting the said reaction chamber and reflux condenser, a vent line communicating with the reaction chamber for venting gases therefrom, a motored vent valve therein for control of venting, a liquid reagent feed line communicating with the reaction chamber for feed of reagent thereto and a motored valve therein for control of liquid reagent feed, a pressure gauge connected to the reaction space for measuring the pressure therein and a primary control means operatively connected to the pressure gauge, a liquid volume meter in the liquid reagent feed line for measuring the volume of liquid reagent and a limit control means operatively connected to the volume meter; the primary control means including a pressure set point mechanism and a pressure rise timer engageable therewith and adapted to raise the pressure set point through a rising pressure path to a preselected pressure during an initial time period, and a hold timer adapted to maintain the pressure set point mechanism at said preselected pressure following the said initial time period, and a controller responsive to any difference between the set point pressure and the actual pressure measured by the pressure gauge and operatively connected to the motored valve in the liquid reagent feed line for opening said valve when the set point pressure exceeds the actual pressure and closing the valve when the actual pressure exceeds the set point pressure; the limit control means being operatively connected to the motored valve in the liquid reagent line and adapted to initiate closure thereof when a predetermined quantity of liquid has passed through the volume meter, and a vent control means operatively connected to the pressure gauge, said vent control means including means responsive to attainment of a predetermined vent pressure for causing opening of the motored vent valve.

4. In combination, a reaction apparatus for the reaction of a batch of comminuted solids with a liquid reagent, a liquid feed system therefor, and a venting system for serially effecting discharge of an inert purge gas and then inert by-products of the reaction, the reaction apparatus including a reaction vessel and vent line communicating thereto and having a pneumatic motored valve therein, the liquid feeding system including a liquid reagent feed line communicating with the reaction chamber for feed of reagent thereto and a motored valve therein for control of liquid reagent feed, a pressure gauge connected to the reaction space for measuring the pressure therein and a primary control means operatively connected to the pressure gauge, a liquid volume meter in the liquid reagent feed line for measuring the volume of liquid reagent and a limit control means operatively connected to the volume meter; the primary control means including a pressure set point mechanism and a pressure rise timer engageable therewith and adapted to raise the pressure set point through a rising pressure path to a preselected pressure during an initial time period, and a hold timer adapted to maintain the pressure set point mechanism at said preselected pressure following the said initial time period, and a controller responsive to any difference between the set point pressure and the actual pressure measured by the pressure gauge and operatively connected to the motored valve in the liquid reagent feed line for opening said valve when the set point pressure exceeds the actual pressure and closing the valve when the actual pressure exceeds the set point pressure; the limit control means being operatively connected to the motored valve in the liquid reagent line and adapted to initiate closure thereof when a predetermined quantity of liquid has passed through the volume meter; the venting system including an operating air suppy line to the motored vent valve and a relay valve therein for controlling air pressure to the said motored vent valve, said relay valve being responsive to the pressure in a bleed nozzle attached thereto and connecting to and supplied with air from the operating air supply line; a control flapper adapted to close the bleed nozzle but normally displaced therefrom, a control air supply line connecting to a normal control branch line and to a lockout control branch line, said connections being through limiting orifices, the normal branch line having a sub-branch (i) having a nozzle terminus and a sub-branch (ii) having an extensible bellows terminus, the lockout branch having a sub-branch (iii) having a nozzle terminus and a sub-branch (iv) having an extensible bellows terminus, both of said bellows being positioned adjacent the said control flapper and adapted to position the said flapper to close the bleed nozzle upon pressure rise in the sub-branches (ii) or (iv), a pressure gauge connected to the reaction space, a normal control flapper adjacent the nozzle terminus of sub-branch (i) and adapted to close said nozzle, and linkage means connecting the pressure gauge and the normal control flapper for closure of the said nozzle upon attainment of a predetermined pressure in the reaction space; a lockout flapper adjacent the nozzle terminus of the sub-branch (iii), timing means for measuring an initial rising pressure period in the reaction vessel and means, responsive to said timing means, positioned adjacent the lockout flapper and adapted to cause at least partial closure of the said nozzle during only said rising pressure period, the limiting orifices connecting the branch lines to the control air supply line being appreciably smaller than the nozzles, in the sub-branch lines, whereby the pressure in each sub-branch line and the extensible bellows terminating each said line is responsive to the pressure in the corresponding nozzle-terminated sub-branch line.

5. In combination, a reaction apparatus for the reaction of a batch of comminuted solids with a liquid reagent and a venting system for serially effecting discharge of an inert purge gas and then inert by-products of the reaction, the reaction apparatus including a reaction vessel and vent line communicating thereto and having a pneumatic motored valve therein, the venting system including an operating air supply line to the motored vent valve and a relay valve therein for controlling air pressure to the said motored vent valve, said relay valve being responsive to the pressure in a bleed nozzle attached thereto and connecting to and supplied with air from the operating air supply line; a control flapper adapted to close the bleed nozzle but normally displaced therefrom, a control air supply line connecting to a normal control branch line and to a lockout control branch line, said connections being through limiting orifices, the normal branch line having a sub-branch (i) having a nozzle terminus and a sub-branch (ii) having an extensible bellows terminus, the lockout branch having a sub-branch (iii) having a nozzle terminus and a sub-branch (iv) having an extensible bellows terminus, both of said bellows being positioned adjacent the said control flapper and adapted to position the said flapper to close the bleed nozzle upon pressure rise in the sub-branches (ii) or (iv), a pressure gauge connected to the reaction space, a normal control flapper adjacent the nozzle terminus of sub-branch (i) and adapted to close said nozzle, and linkage means connecting the pressure gauge and the normal control flapper for closure of the said nozzle upon attainment of a predetermined pressure in the reaction space; a lockout flapper adjacent the nozzle terminus of the sub-branch (iii), timing means for measuring an initial rising pressure period in the reaction vessel and means, responsive to said timing means, positioned adjacent the lockout flapper and adapted to cause at least partial closure of the said nozzle during only said rising pressure period, the limiting orifices connecting the branch lines to the control air supply line being appreciably smaller than the nozzles, in the sub-branch lines, whereby the pressure in each sub-branch line and the extensible bellows terminating each said line is responsive to the pressure in the corresponding nozzle-terminated sub-branch line.

References Cited in the file of this patent

UNITED STATES PATENTS

| | | |
|---|---|---|
| 1,624,294 | Wallace et al. | Apr. 12, 1927 |
| 2,260,111 | Caldwell | Oct. 21, 1941 |
| 2,325,067 | Marks | July 27, 1943 |
| 2,665,197 | Rowland | Jan. 5, 1954 |